US006963765B2

(12) United States Patent
Hattori et al.

(10) Patent No.: US 6,963,765 B2
(45) Date of Patent: Nov. 8, 2005

(54) CARD-TYPE WIRELESS COMMUNICATION DEVICE AND WIRELESS COMMUNICATION SYSTEM INCORPORATING IT

(75) Inventors: Kazumi Hattori, Osaka (JP); Kenji Itagaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 849 days.

(21) Appl. No.: 10/017,294

(22) Filed: Dec. 18, 2001

(65) Prior Publication Data

US 2002/0094840 A1 Jul. 18, 2002

(30) Foreign Application Priority Data

Dec. 18, 2000 (JP) .............................. 2000-383077

(51) Int. Cl.[7] ................................................ H04B 1/38
(52) U.S. Cl. .................. 455/574; 455/572; 455/343.2; 455/343.5
(58) Field of Search .................... 455/558, 550.1, 455/572, 67.1, 574, 90.1, 188.1, 343.5, 343.2, 455/334, 90.2, 90.3, 556.1, 522, 63.3, 127.1, 455/1, 70, 71, 74, 74.1, 83, 554.2, 2, 557, 455/133, 134, 136, 140, 153.2, 177.1, 178.1, 455/186.1

(56) References Cited

U.S. PATENT DOCUMENTS

| 5,471,655 | A | * | 11/1995 | Kivari ..................... 455/127.5 |
| 5,678,229 | A | * | 10/1997 | Seki et al. .................. 455/572 |
| 6,292,858 | B1 | * | 9/2001 | Inkinen et al. .............. 710/301 |
| 6,870,890 | B1 | * | 3/2005 | Yellin et al. ................ 375/340 |

FOREIGN PATENT DOCUMENTS

JP 11-186927 7/1999

* cited by examiner

Primary Examiner—Binh Tieu
Assistant Examiner—Barry W Taylor
(74) Attorney, Agent, or Firm—Nixon & Vanderhye, PC

(57) ABSTRACT

A card-type wireless communication device and a wireless communication system incorporating it, designed for low power consumption, comprises the first control block for controlling the first switching block so as to turn on or off power for each of the transmitter circuit, the base-band signal processing circuit, and the interface circuit independently in accordance with a plurality of different detection signals generated by the receiving signal level detection block according to the intensity of the received high-frequency signal; and the second control block for controlling the second switching block so as to turn on or off a plurality of amplifiers independently and controlling the third switching block so as to bring any amplifier that is turned on into the non-shortcircuited state and any amplifier that is turned off into the shortcircuited state.

10 Claims, 6 Drawing Sheets

FIG. 5

| Intensity of Received Signal | Detection Signal | First Switching Block | | |
|---|---|---|---|---|
| | | 33a | 33b | 33c |
| Stronger ↓ Weaker | 1st. detection signal | ON | ON | ON |
| | 2nd. detection signal | OFF | ON | ON |
| | 3rd. detection signal | OFF | OFF | ON |
| | 4th. detection signal | OFF | OFF | OFF |

FIG. 6

| Intensity of Received Signal | Detection Signal | Second Switching Block | | Third Switching Block | |
|---|---|---|---|---|---|
| | | 36a | 36b | 37a | 37b |
| Stronger ↓ Weaker | Detection signal 1a | OFF | OFF | ON | ON |
| | Detection signal 1b | ON | OFF | OFF | ON |
| | Detection signal 1c | ON | ON | OFF | OFF |

CARD-TYPE WIRELESS COMMUNICATION DEVICE AND WIRELESS COMMUNICATION SYSTEM INCORPORATING IT

BACKGROUND OF THE INVENTION

1. Field of the Invention

The present invention relates to a card-type wireless communication device and a wireless communication system incorporating it, having wireless communication capability, using a frequency-hopping system based on spread-spectrum technology, and connected to an information terminal device such as a personal computer.

2. Description of the Prior Art

In general, in communication using spread-spectrum technology at a transmitter, a modulated signal from an input base-band signal such as an audio signal, after having been spectrum-spread with diffusion codes, is transmitted to a receiver in the form of high-frequency signal. At the same time, at the receiver, the spectrum-spread signal received from the transmitter is demodulated (back diffused) using the same diffusion codes as used by the transmitter.

Communication systems that utilize spread-spectrum technology include a direct-spread system and a frequency-hopping system. In the direct-spread system, narrow-band modulated waves are multiplied by diffusion codes and spread among given continuous frequency bands. On the other hand, in the frequency-hopping system, an example of which is a technology called Bluetooth, carrier frequencies transmitted to the receiver are changed in a random order and transmission signals are spread among given frequency bands.

FIG. 7 is a block circuit diagram showing a simplified configuration of the conventional card-type wireless communication device. A conventional card-type wireless communication device 50 as shown in FIG. 7 has a circuit configuration described hereinafter. An antenna 51 is connected to a receiver circuit 52 and a transmitter circuit 57.

The receiver circuit 52 comprises an amplifier 53, a mixer circuit 54, and a demodulation circuit 55. The antenna 51 is connected to a base-band signal processing circuit 61 via the amplifier 53, the mixer circuit 54, and the demodulation circuit 55. Furthermore, the transmitter circuit 57 comprises a modulation circuit 60, a mixer circuit 59, and an amplifier 58. The base-band signal processing circuit 61 is connected to the antenna 51 via the modulation circuit 60, the mixer circuit 59, and the amplifier 58. The mixer circuits 54 and 59 are connected to a local oscillator 56.

The base-band signal processing circuit 61 is connected to a connector 65 via an interface circuit 62. Moreover, a circuit control block 63 is connected to each of the receiver circuit 52, the transmitter circuit 57, and the base-band processing circuit 61. A power supply circuit 64 is connected to the connector 65 and each of the aforementioned circuits of the card-type wireless communication device 50.

Next, how the conventional card-type wireless communication device functions is described. A signal sent from a transmitter and received through the antenna 51 by a receiver, in the form of spread-spectrum signal (e.g. 2.4 GHz band), is amplified by the amplifier 53 and fed to the mixer circuit 54. The high-frequency signal thus received is demodulated into a base-band signal by the mixer circuit 54 and the demodulation circuit 55. Then, the restored base-band signal is fed into the base-band signal processing circuit 61 for necessary signal processing and fed to an information terminal device (not shown) such as a personal computer through the interface circuit 62 and the connector 65.

At the transmitter, an input data signal fed from an information terminal device (not shown) such as a personal computer through the connector 65 and the interface circuit 62 is fed into the base-band circuit 61 for prescribed signal processing in, diffused as spread-spectrum signals (e.g. 2.4 GHz band) by the modulation circuit 60 and the mixer circuit 59, amplified by the amplifier 58, and transmitted to the receiver through the antenna 51.

The circuit control block 63 controls each operation of the receiver circuit 52, the transmitter circuit 57, and the base-band signal processing circuit 61. The power supply circuit 64 receives power from the information terminal device (not shown) such as a personal computer via the connector 65 and delivers a supply voltage +B to each of the aforementioned internal circuits of the card-type wireless communication device 50.

The local oscillator 56 generates a frequency signal (e.g. 2.4 GHz) required for function of each of the mixer circuits 54 and 59.

In the above-mentioned conventional technology, no particular problems relating to power occur as long as the information terminal device (not shown) such as a personal computer is operated on commercial power supply, because power is supplied from the information terminal device such as a personal computer to the power supply circuit 64 of the card-type wireless communication device 50 through the connector 65.

However, when the information terminal device such as a personal computer is carried and used as mobile equipment, the information terminal device such as a personal computer operates on a battery included therein and the power supply circuit 64 of the card-type wireless communication device 50 receives power from the battery included in the information terminal device such as a personal computer via the connector 65. As a result, the information terminal device such as a personal computer can only be used for a shorter period of time as mobile use, because an increase in power consumed by the card-type wireless communication device 50 results in faster discharge of the battery included in the information terminal device such as a personal computer.

SUMMARY OF THE INVENTION

An object of the present invention is, in order to solve the aforementioned problem, to provide a card-type wireless communication device and a wireless communication system incorporating it capable of saving power by turning on or off, for each of circuits thereof independently, power fed thereto according to intensity of received high-frequency signals.

To achieve the above object, according to one aspect of the present invention, a card-type wireless communication device connected to an information terminal device, comprises an antenna; a receiver circuit for performing frequency conversion and demodulation on a high-frequency signal received through the antenna so as to output a base-band reception signal; a transmitter circuit for performing modulation and frequency conversion on a base-band transmission signal fed thereto so as to output a high-frequency signal to the antenna; a base-band signal processing circuit for processing the base-band reception signal and the base-band transmission signal; an interface circuit that functions as an interface between the card-type wireless communication device and the information terminal device;

a power supply circuit for supplying power to each of the transmitter circuit, the base-band signal processing circuit, and the interface circuit; a connector for connecting the card-type wireless communication device to the information terminal device; a receiving signal level detection block that outputs a plurality of different detection signals according to intensity of the high-frequency signal received through the antenna; a first switching block that for turning on or off, for each of the transmitter circuit, the base-band signal processing circuit, and the interface circuit, power fed from the power supply circuit thereto; a first memory block for storing data as to which of the transmitter circuit, the base-band signal processing circuit, and the interface circuit to turn on or off in association with each of the detection signals; and a first control block for controlling the first switching block so as to turn on or off power fed to each of the transmitter circuit, the base-band signal processing circuit, and the interface circuit according to the detection signals and the data stored in the first memory block.

According to another aspect of the present invention, the card-type wireless communication device as described above, further comprises a plurality of amplifiers included in the receiver circuit and connected in series with each other for amplifying the high-frequency signal received through the antenna; a second switching block for turning on or off, for each of the amplifiers independently, power fed from the power supply circuit thereto; a third switching block for bringing into the shortcircuited or non-shortcircuited state each of the amplifiers independently; a second memory block for storing data as to which of the amplifiers to turn on or off in association with each of the detection signals; and a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

According to another aspect of the present invention, in the card-type wireless communication device as described above, the receiving level detection circuit outputs a first detection signal, a second detection signal, third detection signal, or a fourth detection signal in decreasing order of the intensity detected of the received signal, and the data stored in the first memory block is such that in association with the first detection signal, all of the transmission circuit, the base-band signal processing circuit, and the interface circuit are turned on; in association with the second detection signal, the transmission circuit is turned off and the base-band signal processing circuit and the interface circuit are turned on; in association with the third detection signal, the transmission circuit and the base-band signal processing circuit are turned off and the interface circuit is turned on; and in association with the fourth detection signal, all of the transmission circuit, the base-band signal processing circuit, and the interface circuit are turned off.

According to another aspect of the present invention, in the card-type wireless communication device as described above, the high-frequency signal transmitted or received through the antenna is in a 2.4-GHz frequency band and uses a frequency-hopping system based on spread-spectrum technology.

According to another aspect of the present invention, a wireless communication system having an information terminal device, comprises a card-type wireless communication device, comprising:
an antenna; a receiver circuit for performing frequency conversion and demodulation on a high-frequency signal received through the antenna so as to output a base-band reception signal; a transmitter circuit for performing modulation and frequency conversion on a base-band transmission signal fed thereto so as to output a high-frequency signal to the antenna; a base-band signal processing circuit for processing the base-band reception signal and the base-band transmission signal; an interface circuit that functions as an interface between the card-type wireless communication device and the information terminal device; a power supply circuit for supplying power to each of the transmitter circuit, the base-band signal processing circuit, and the interface circuit; a connector for connecting the card-type wireless communication device to the information terminal device; a receiving signal level detection block that outputs a plurality of different detection signals according to intensity of the high-frequency signal received through the antenna; and a first switching block for turning on or off, for each of the transmitter circuit, the base-band signal processing circuit, and the interface circuit independently, power fed from the power supply circuit thereto,
wherein said information terminal device comprises
a first memory block for storing data as to which of the transmitter circuit, the base-band signal processing circuit, and the interface circuit to turn on or off in association with each of the detection signals; and a first control block for controlling the first switching block so as to turn on or off power fed to each of the transmitter circuit, the base-band signal processing circuit, and the interface circuit according to the detection signals and the data stored in the first memory block.

According to another aspect of the present invention, the wireless communication system as described above, further comprises a plurality of amplifiers included in the receiver circuit of the card-type wireless communication device and connected in series with each other for amplifying the high-frequency signal received through the antenna; a second switching block for turning on or off, for each of the amplifiers independently, power fed from the power supply circuit thereto; a third switching block for bringing into the shortcircuited or non-shortcircuited state each of the amplifiers independently; a second memory block included in the information terminal device for storing data as to which of the amplifiers to turn on or off in association with each of the detection signals; and a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

According to another aspect of the present invention, in the wireless communication system as described above, the receiving level detection circuit outputs a first detection signal, a second detection signal, third detection signal, or a fourth detection signal in decreasing order of the intensity detected of the received signal, and the data stored in the first memory block is such that in association with the first detection signal, all of the transmission circuit, the base-band signal processing circuit, and the interface circuit are turned on; in association with the second detection signal, the transmission circuit is turned off and the base-band signal processing circuit and the interface circuit are turned on; in association with the third detection signal, the transmission circuit and the base-band signal processing circuit are turned off and the interface circuit is turned on; and in association with the fourth detection signal, all of the transmission circuit, the base-band signal processing circuit, and the interface circuit are turned off.

According to another aspect of the present invention, in the wireless communication system as described above, the high-frequency signal transmitted or received through the antenna is in a 2.4-GHz frequency band and uses a frequency-hopping system based on spread-spectrum technology.

BRIEF DESCRIPTION OF THE DRAWINGS

This and other objects and features of the present invention will become clear from the following description, taken in conjunction with the preferred embodiments with reference to the accompanying drawings in which:

FIG. 5 is a table showing data stored in the first memory block of the card-type wireless communication device of the first embodiment and of the wireless communication system of the second embodiment;

FIG. 6 is a table showing data stored in the second memory block of the card-type wireless communication device of the first embodiment and of the wireless communication system of the second embodiment.

DESCRIPTION OF THE PREFERRED EMBODIMENTS

Hereinafter, embodiments of the present invention will be described with reference to the accompanying drawings.

Figure 1:
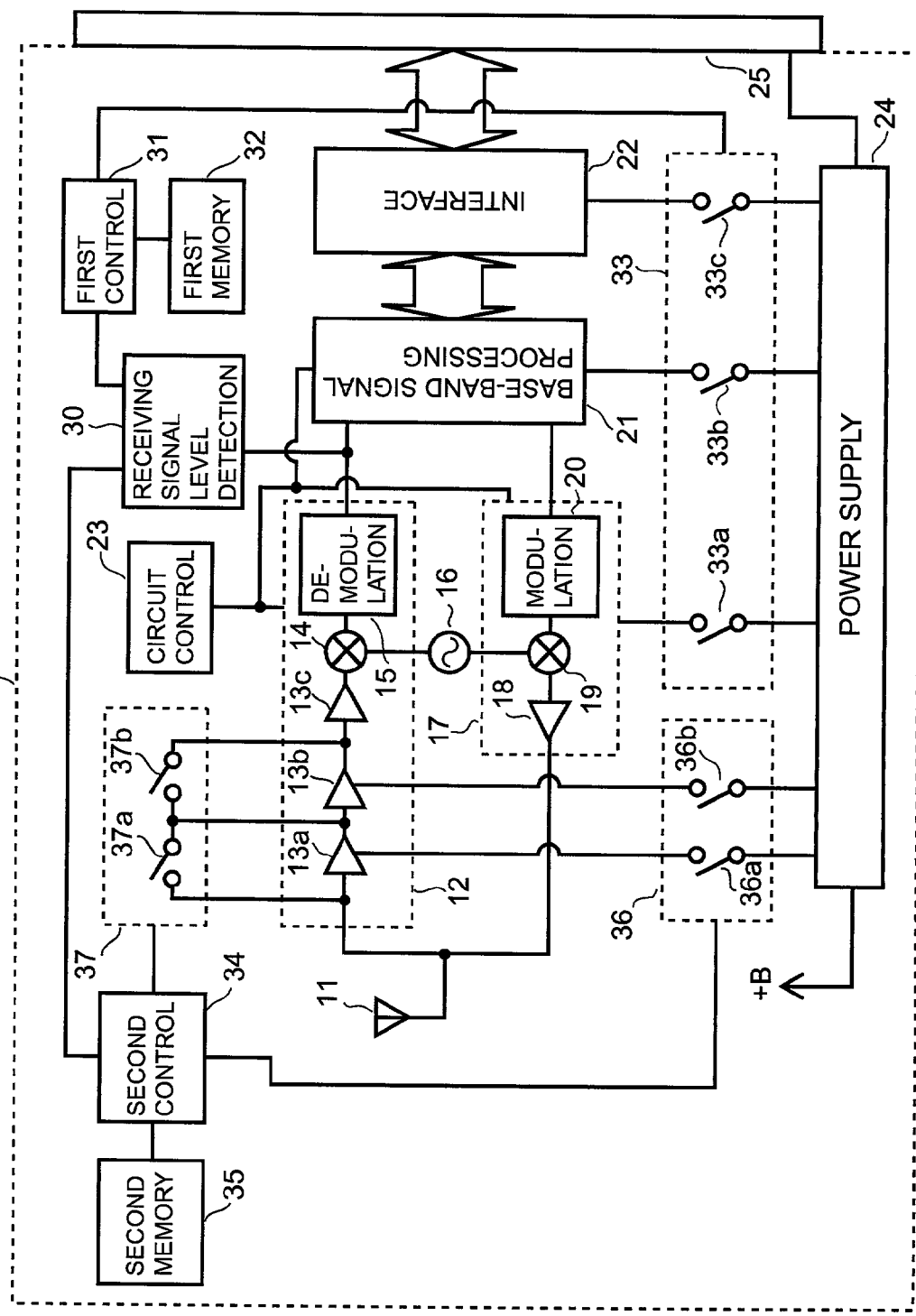
FIG. 1 is a block circuit diagram showing a simplified configuration of the card-type wireless communication device of a first embodiment.

FIG. 1 is a block circuit diagram showing a simplified configuration of the card-type wireless communication device of a first embodiment. A card-type wireless communication device 1 of the first embodiment as shown in FIG. 1 has a circuit configuration described hereinafter. An antenna 11 is connected to a receiver circuit 12 and a transmitter circuit 17.

The receiver circuit 12 comprises a plurality of amplifiers 13a, 13b, and 13c connected in series with each other, a mixer circuit 14, and a demodulation circuit 15. The antenna 11 is connected to a base-band signal processing circuit 21 through the amplifiers 13a, 13b, and 13c, the mixer circuit 14, and the demodulation circuit 15. Furthermore, the transmitter circuit 17 comprises a modulation circuit 20, a mixer circuit 19, and an amplifier 18. The base-band signal processing circuit 21 is connected to the antenna 11 through the modulation circuit 20, the mixer circuit 19, and the amplifier 18. The mixer circuits 14 and 19 are connected to a local oscillator 16.

The base-band signal processing circuit 21 is connected to a connector 25 via an interface circuit 22. Furthermore, a circuit control block 23 is connected to each of the receiver circuit 12, the transmitter circuit 17, and the base-band processing circuit 21.

A power supply circuit 24 is connected to the connector 25 and each of the three circuits including the transmitter circuit 17, the base-band signal processing circuit 21, and the interface circuit 22 through each of switch circuits 33a, 33b, and 33c of a first switching block 33. The power supply circuit 24 is also connected to each of the amplifiers 13a and 13b through each of switch circuits 36a and 36b of a second switching block 36. Furthermore, the power supply circuit 24 is connected directly to each circuit, excluding the above-mentioned circuits, of the card-type wireless communication device 1.

The amplifiers 13a and 13b are connected to switch circuits 37a and 37b of a third switching block 37 respectively.

An output of the demodulation circuit 15 is connected to a receiving signal level detection block 30 of which an output side is connected to the first switching block 33 through a first control block 31, and to the second switching block 36 and the third switching block 37 through a second control block 34.

At the same time, a first memory block 32 is connected to the first control block 31 and a second memory block 35 is connected to the second control block 34.

Next, functions of the card-type wireless communication device 1 of the first embodiment as shown in FIG. 1 are described hereinafter. A signal sent from a transmitter and received through the antenna 11 by a receiver, in the form of spread-spectrum signal (e.g. 2.4 GHz band), is amplified by the amplifiers 13a, 13b, and 13c and fed to the mixer circuit 14. The high-frequency signal thus received is demodulated into a base-band signal by the mixer circuit 14 and the demodulation circuit 15. Then, the restored base-band signal is fed into the base-band signal processing circuit 21 for necessary signal processing and fed to an information terminal device (not shown) such as a personal computer through the interface circuit 22 and the connector 25.

At the transmitter, an input data signal fed from the information terminal device (not shown) such as a personal computer through the connector 25 and the interface circuit 22 is fed into the base-band circuit 21 for necessary signal processing, diffused as spread-spectrum signals (e.g. 2.4 GHz band) by the modulation circuit 20 and the mixer circuit 19, amplified by the amplifier 18, and transmitted to the receiver through the antenna 11.

The circuit control block 23 controls each operation of the receiver circuit 12, the transmitter circuit 17, and the base-band signal processing circuit 21.

The power supply circuit 24 receives power from the information terminal device such as a personal computer through the connector 25 and distributes a supply voltage +B which is required for operation of each internal circuit of the card-type wireless communication device 1, to the three circuits including the transmitter circuit 17, the base-band signal processing circuit 21, and the interface circuit 22 through each of the switch circuits 33a, 33b, and 33c of the first switching block 33. The supply voltage +B is also supplied to each of the amplifiers 13a and 13b through each of the switch circuits 36a and 36b of the second switching block 36. Furthermore, the power supply circuit 24 also distributes the supply voltage +B required for operation of each internal circuit directly thereto excluding the above-mentioned circuits of the card-type wireless communication device 1.

The receiving signal level detection block 30 outputs a plurality of different detection signals to the first control block 31 and the second control block 34 in accordance with intensity of the high-frequency signal received through the antenna 11.

The first switching block 33, through each of the switch circuits 33a, 33b, and 33c thereof, turns on or off, for each of the aforementioned three circuits including the transmitter circuit 17, the base-band signal processing circuit 21, and the interface circuit 22 independently, power supplied thereto from the power supply circuit 24.

The first memory block 32 stores data as to which of the aforementioned three circuits to turn on or off in association with each of the different detection signals.

The first control block 31 controls the first switching block 33 so as to turn on or off power supplied to each of the three circuits in accordance with the different detection signals and the data stored in the first memory block 32.

The second switching block 36, through the switch circuits 36a and 36b thereof, turns on or off, for each of the amplifiers 13a and 13b independently, power supplied thereto from the power supply circuit 24.

The third switching block 37, through each of the switch circuit 36a or 36b thereof, brings into the shortcircuited or non-shortcircuited state each of the amplifiers 13a and 13b independently.

The second memory block 35 stores data as to which of the amplifiers 13a and 13b to turn on or off in association with the different detection signals.

The second control block 34 controls the second switching block 36 so as to turn on or off power fed to each of the amplifiers 13a and 13b according to the different detection signals and the data stored in the second memory block 35 and controls also the third switching block 37 so as to bring any amplifier that is turned on into the non-shortcircuited state and any amplifier that is turned off into the shortcircuited state.

Figure 2:
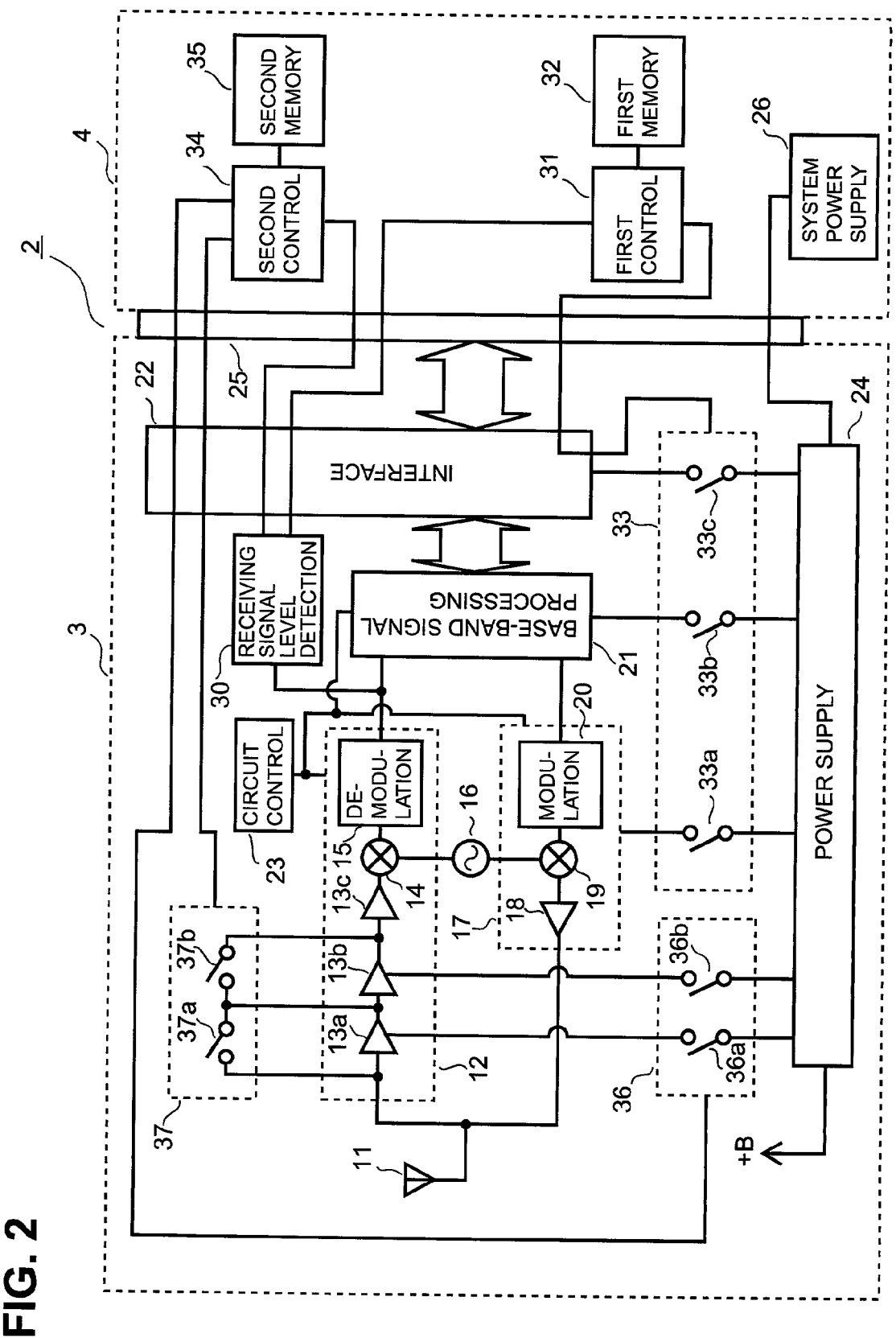
FIG. 2 is a block circuit diagram showing a simplified configuration of the wireless communication system of a second embodiment.

FIG. 2 is a block circuit diagram showing a simplified configuration of the wireless communication system of a second embodiment. A wireless communication system 2 of the second embodiment as shown in FIG. 2 comprises a card-type wireless communication device 3 and an information terminal device 4. The information terminal device 4 is, for example, a personal computer or the like.

The card-type wireless communication device 3 of the wireless communication system 2 relating to the second embodiment has a circuit configuration described hereinafter. An antenna 11 is connected to a receiver circuit 12 and a transmitter circuit 17.

The receiver circuit 12 comprises a plurality of amplifiers 13a, 13b, and 13c connected in series with each other, a mixer circuit 14, and a demodulation circuit 15. The antenna 11 is connected to a base-band signal processing circuit 21 through the amplifiers 13a, 13b, and 13c, the mixer circuit 14, and the demodulation circuit 15. Furthermore, the transmitter circuit 17 comprises a modulation circuit 20, a mixer circuit 19, and an amplifier 18. The base-band signal processing circuit 21 is connected to the antenna 11 through the modulation circuit 20, the mixer circuit 19, and the amplifier 18. The mixer circuits 14 and 19 is connected to a local oscillator 16.

The base-band signal processing circuit 21 is connected to a connector 25 via an interface circuit 22. Furthermore, a circuit control block 23 is connected to each of the receiver circuit 12, the transmitter circuit 17, and the base-band processing circuit 21.

A power supply circuit 24 is connected, through the connector 25, to a system power supply circuit 26 of the information terminal device 4 which will be described later, and each of the three circuits including the transmitter circuit 17, the base-band signal processing circuit 21, and the interface circuit 22 through each of switch circuits 33a, 33b, and 33c of a first switching block 33. The power supply circuit 24 is also connected to each of the amplifiers 13a and 13b through each of switch circuits 36a and 36b of a second switching block 36. Furthermore, the power supply circuit 24 is connected directly to each circuit of the card-type wireless communication device 3, excluding the above-mentioned circuits.

The amplifiers 13a and 13b are connected to switch circuits 37a and 37b of a third switching block 37 respectively.

An output of the demodulation circuit 15 is connected to a receiving signal level detection block 30 of which an output side is connected to the first switching block 33 through the interface circuit 22, a first control block 31 of the information terminal device 4 which will be described later, and again the interface circuit 22; and the second switching block 36 and the third switching block 37 through the interface circuit 22, a second control block 34 of the information terminal device 4 which will be described later, and again the interface circuit 22.

The information terminal device 4 of the wireless communication system 2 of this embodiment includes the first control block 31 to which a first memory block 32 is connected, the second control block 34 to which a second memory block 35 is connected, and the system power supply circuit 26.

The system power supply circuit 26 is connected to the power supply circuit 24 of the card-type wireless communication device 3 through the connector 25.

Next, functions of the wireless communication system 2 of this embodiment as shown in FIG. 2 are described. At a receiving side of the card-type wireless communication device 3, a signal sent from a transmitter and received through the antenna 11 in the form of spread-spectrum signal (e.g. 2.4 GHz band), is amplified by the amplifiers 13a, 13b, and 13c and fed to the mixer circuit 14. The high-frequency signal thus received is demodulated into a base-band signal by the mixer circuit 14 and the demodulation circuit 15. Then, the restored base-band signal is fed into the base-band signal processing circuit 21 for necessary signal processing and fed to the information terminal device 4 such as a personal computer through the interface circuit 22 and the connector 25.

At a transmitting side of the card-type wireless communication device 3, an input data signal fed from the information terminal device 4 such as a personal computer through the connector 25 and the interface circuit 22 is fed into the base-band circuit 21 for necessary signal processing, diffused as spread-spectrum signals (e.g. 2.4 GHz band) by the modulation circuit 20 and the mixer circuit 19, amplified by the amplifier 18, and transmitted to the receiver through the antenna 11.

The circuit control block 23 controls each operation of the receiver circuit 12, the transmitter circuit 17, and the base-band signal processing circuit 21.

The power supply circuit 24 receives power from the information terminal device 4 such as a personal computer through the connector 25 and distributes a supply voltage +B which is required for operation of each internal circuit of the card-type wireless communication device 3, to the three circuits including the transmitter circuit 17, the base-band signal processing circuit 21, and the interface circuit 22 through each of the switch circuits 33*a*, 33*b*, and 33*c* of the first switching block 33. The supply voltage +B is also supplied to each of the amplifiers 13*a* and 13*b* through each of the switch circuits 36*a* and 36*b* of the second switching block 36. Furthermore, the power supply circuit 24 also distributes the supply voltage +B required for operation of each internal circuit directly thereto, excluding the above-mentioned circuits of the card-type wireless communication device 3.

The receiving signal level detection block 30 outputs a plurality of different detection signals to the first control block 31 and the second control block 34 in accordance with intensity of the high-frequency signal received through the antenna 11.

The first switching block 33, through each of the switch circuits 33*a*, 33*b*, and 33*c* thereof, turns on or off, for each of the aforementioned three circuits including the transmitter circuit 17, the base-band signal processing circuit 21, and the interface circuit 22 independently, power supplied thereto from the power supply circuit 24.

The second switching block 36, through each of the switch circuits 36*a* and 36*b* thereof, turns on or off, for each of the amplifiers 13*a* and 13*b* independently, power supplied thereto from the power supply circuit 24.

The third switching block 37, through each of the switch circuit 36*a* or 36*b* thereof, brings into the shortcircuited or non-shortcircuited state each of the amplifiers 13*a* and 13*b* independently.

Hereinafter described are the first memory block 32, the first control block 31, the second memory block 35, and the second control block 34, each of which is incorporated in the information terminal device 4 such as a personal computer.

The first memory block 32 stores data as to which of the aforementioned three circuits to turn on or off in association with each of the different detection signals generated in the card-type wireless communication device 3.

The first control block 31 controls the first switching block 33 through the interface circuit 22 so as to turn on or off power supplied to each of the three circuits in accordance with the different detection signals generated in the card-type wireless communication device 3 and the data stored in the first memory block 32.

The second memory block 35 stores data as to which of the amplifiers 13*a* and 13*b* to turn on or off in association with the different detection signals generated in the card-type wireless communication device 3.

The second control block 34 controls the second switching block 36 through the interface circuit 22 so as to turn on or off power fed to each of the amplifiers 13*a* and 13*b* according to the different detection signals generated in the card-type wireless communication device 3 and the data stored in the second memory block 35, and controls also the third switching block 37 through the interface circuit 22 so as to bring any amplifier that is turned on into the non-shortcircuited state and any amplifier that is turned off into the shortcircuited state.

Figure 3:
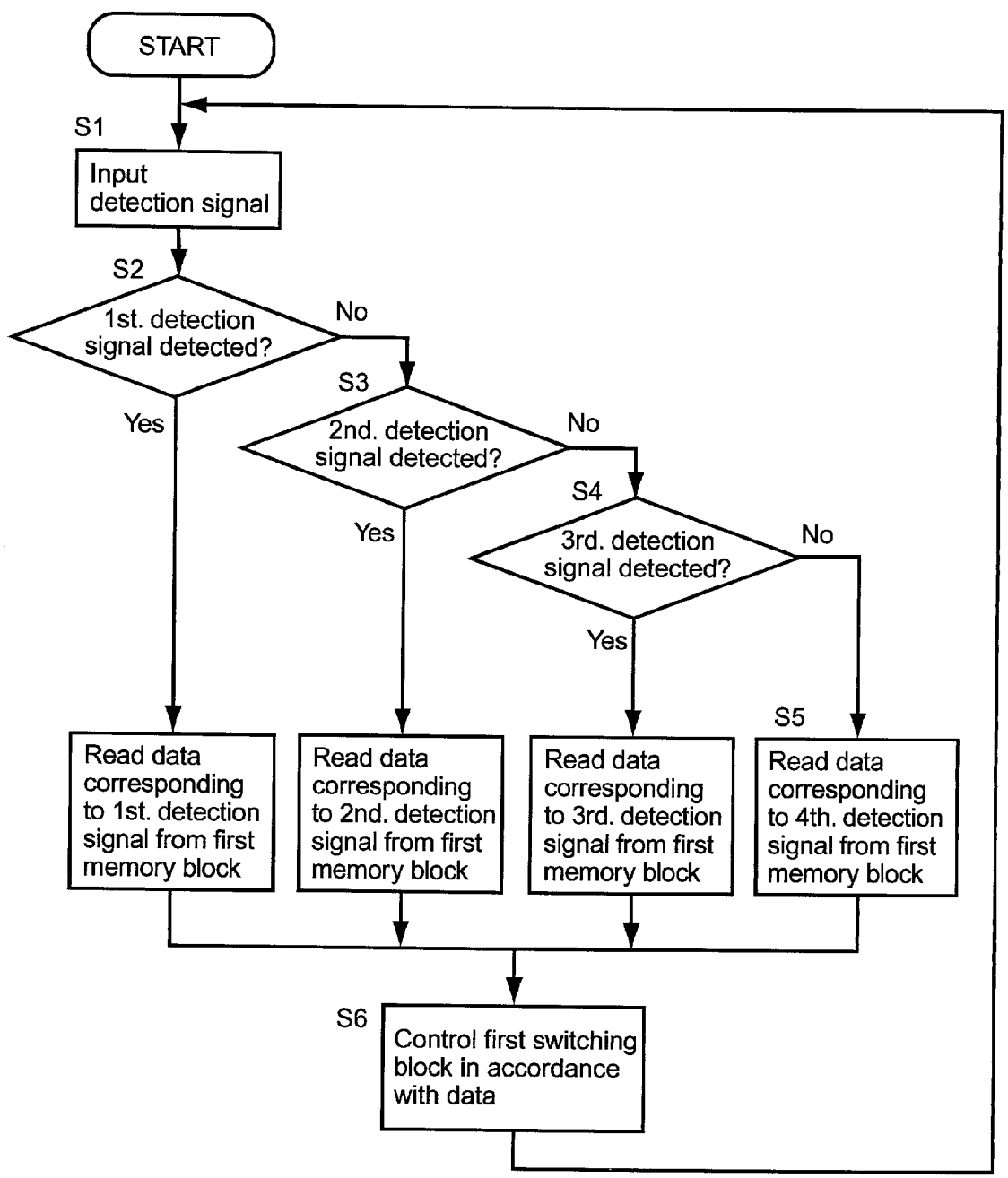
FIG. 3 is a flowchart showing functions of the first control block of the card-type wireless communication device of the first embodiment and of the wireless communication system of the second embodiment.

FIG. 3 is a flowchart showing functions of the first control block of the card-type wireless communication device of the first embodiment and of the wireless communication system of the second embodiment. FIG. 5 is a table showing data stored in the first memory block of the card-type wireless communication device of the first embodiment and of the wireless communication system of the second embodiment.

The data stored in the first memory block 32 of the card-type wireless communication device 1 and the wireless communication system 2 relating to the first and second embodiments is described hereinafter with reference to FIG. 5.

The receiving signal level detection block 30 outputs a first detection signal, a second detection signal, a third detection signal, or a fourth detection signal in decreasing order of the intensity detected of the received signal.

The data stored in the first memory block 32 in association with the first detection signal is such that, of the first switching block 33, the switch circuit 33*a* is turned on, the switch circuit 33*b* is turned on, and the switch circuit 33*c* is turned on. As a result, the transmitter circuit 17, the base-band signal processing circuit 21, and the interface circuit 22 are all turned on.

The data stored in association with the second detection signal is such that, of the first switching block 33, the switch circuit 33*a* is turned off, the switch circuit 33*b* is turned on, and the switch circuit 33*c* is turned on. As a result, the transmitter circuit 17 is turned off, the base-band signal processing circuit 21 and the interface circuit 22 are turned on.

The data stored in association with the third detection signal is such that, of the first switching block 33, the switch circuit 33*a* is turned off, the switch circuit 33*b* is turned off, and the switch circuit 33*c* is turned on. As a result, the transmitter circuit 17 and the base-band signal processing circuit 21 are turned off and the interface circuit 22 is turned on.

The data stored in the first memory block 32 in association with the fourth detection signal is such that, of the first switching block 33, the switch circuit 33*a* is turned off, the switch circuit 33*b* is turned off, and the switch circuit 33*c* is turned off. As a result, the transmitter circuit 17, the base-band signal processing circuit 21, and the interface circuit 22 are all turned off.

Functions of the first control block 31 of the card-type wireless communication device 1 and the wireless communication system 2 relating to the first and second embodiments are described hereinafter with reference to FIG. 3.

The receiving signal level detection block 30 outputs a first detection signal, a second detection signal, a third detection signal, or a fourth detection signal in decreasing order of the intensity detected of the received signal.

In step S1, a detection signal is input from the receiving signal level detection block 30. Thereafter, the flow goes to step S2.

In step S2, the detection signal thus fed is judged whether it is the first detection signal. If it is the first detection signal, after data associated therewith is read from the first memory block 32, the flow goes to step S6. If the detection signal thus fed is not the first detection signal, then the flow goes to step S3.

In step S3, the detection signal thus fed is judged whether it is the second detection signal. If it is the second detection signal, after data associated therewith is read from the first memory block 32, the flow goes to step S6. If the detection signal thus fed is not the second detection signal, then the flow goes to step S4.

In step S4, the detection signal thus fed is judged whether it is the third detection signal. If it is the third detection signal, after data associated therewith is read from the first memory block 32, the flow goes to step S6. If the detection signal thus fed is not the third detection signal, then the flow goes to step S5.

In step S5, the detection signal thus fed is the fourth detection signal. Therefore, after data associated therewith is read from the first memory block 32, the flow goes to step S6

In step S6, the switch circuits 33a, 33b, and 33c of the first switching block 33 are controlled in accordance with the data read during any one of steps 2 to 5. Thereafter, the flow returns to step S1.

As described above, the first control block 31 controls the switch circuits 33a, 33b, and 33c so as to turn on all of the transmitter circuit 17, the base-band processing circuit 21, and the interface circuit 22 if the detection signal is the first detection signal; turn off the transmitter circuit 17, and turns on the base-band processing circuit 21 and the interface circuit 22 if the detection signal is the second detection signal; turn off the transmitter circuit 17 and the base-band processing circuit 21, and turns on the interface circuit 22 if the detection signal is the third detection signal; and turn off all of the transmitter circuit 17, the base-band processing circuit 21, and the interface circuit 22 if the detection signal is the fourth detection signal.

Figure 4:
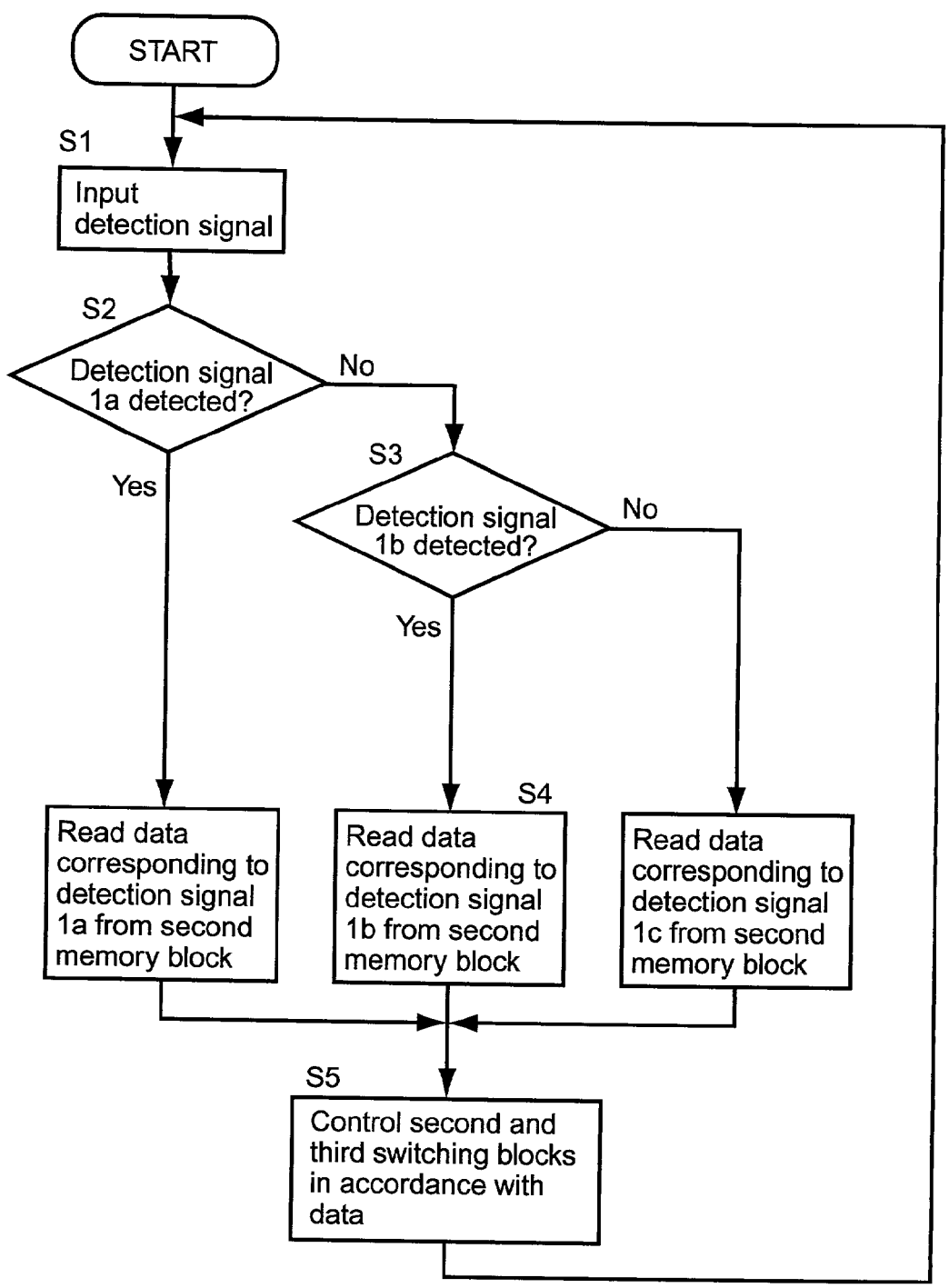
FIG. 4 is a flowchart showing functions of the second control block of the card-type wireless communication device of the first embodiment and of the wireless communication system of the second embodiment.
Figure 7:
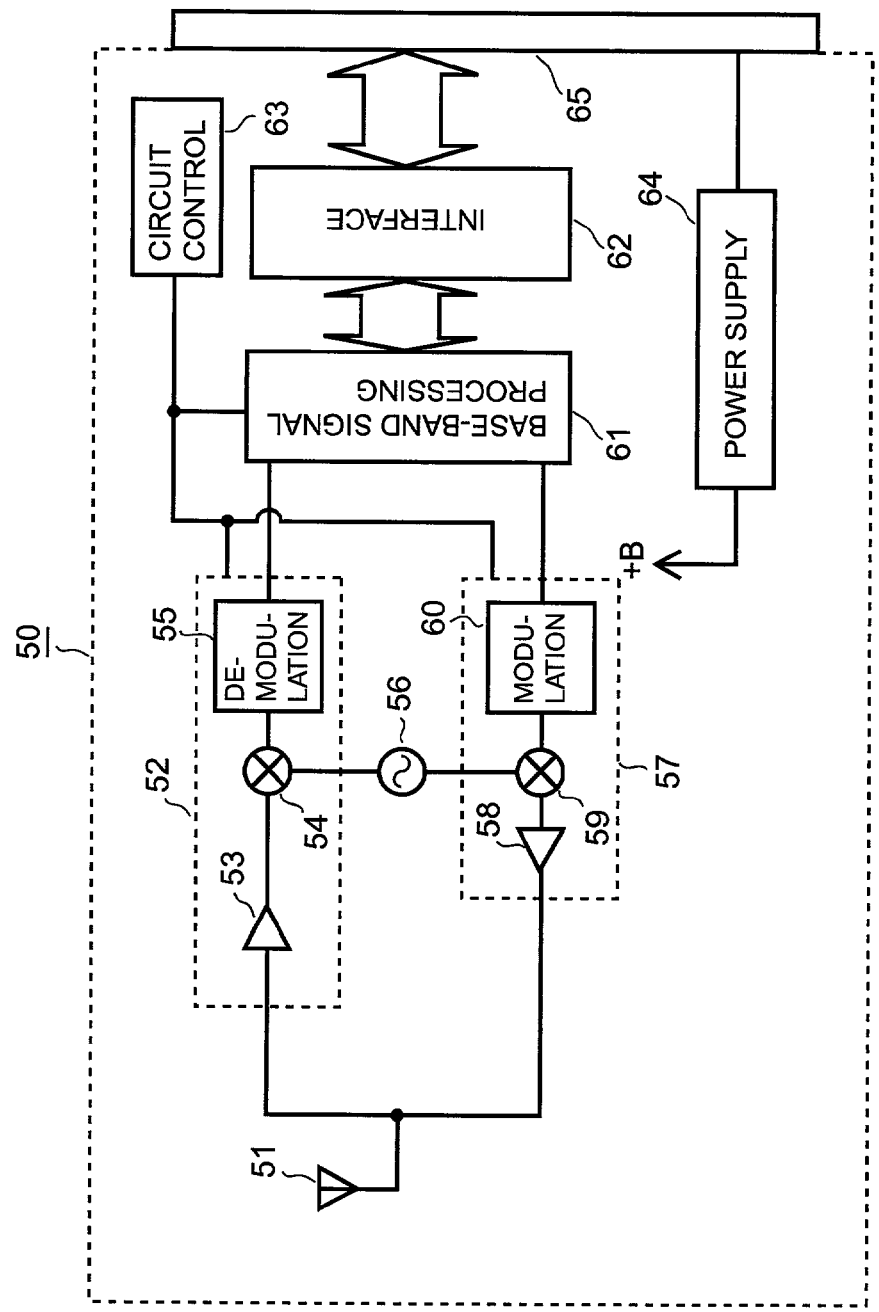
FIG. 7 is a block circuit diagram showing a simplified configuration of the conventional card-type wireless communication device.

FIG. 4 is a flowchart showing functions of the second control block of the card-type wireless communication device and the wireless communication system relating to the first and second embodiments. FIG. 6 is a table showing data of the second memory block of the card-type wireless communication device and the wireless communication system relating to the first and second embodiments.

The data stored in the second memory block 35 of the card-type wireless communication device 1 and the wireless communication system 2 of the first and second embodiments is described hereinafter with reference to FIG. 6.

The receiving signal level detection block 30 outputs detection signals 1a, 1b, and 1c in decreasing order of the intensity detected of the received signal.

The data stored in the second memory block 35 in association with the detection signal 1a is such that; of the second switching block 36, the switch circuit 36a is turned off and the switch circuit 36b is turned off; and of the third switching block 37, the switch circuit 37a is turned on and the switch circuit 37b is turned on. As a result, the amplifier 13a is brought into the shortcircuited state while power supplied thereto is turned off and the amplifier 13b is brought into the shortcircuited state while power supplied thereto is turned off.

Likewise, the data stored in the second memory block 35 in association with the detection signal 1b is such that; of the second switching block 36, the switch circuit 36a is turned on and the switch circuit 36b is turned off; and of the third switching block 37, the switch circuit 37a is turned off and the switch circuit 37b is turned on. As a result, the amplifier 13a is brought into the non-shortcircuited state while power supplied thereto is turned on and the amplifier 13b is brought into the shortcircuited state while power supplied thereto is turned off.

Likewise, the data stored in the second memory block 35 in association with the detection signal 1c is such that; of the second switching block 36, the switch circuit 36a is turned on and the switch circuit 36b is turned on; and of the third switching block 37, the switch circuit 37a is turned off and the switch circuit 37b is turned off. As a result, the amplifier 13a is brought into the non-shortcircuited state while power supplied thereto is turned on and the amplifier 13b is brought into the non-shortcircuited state while power supplied thereto is turned on.

Functions of the second control block 34 of the card-type wireless communication device 1 and the wireless communication system 2 of the first and second embodiments are described hereinafter with reference to FIG. 4.

The receiving signal level detection block 30 outputs the detection signals 1a, 1b, and 1c in decreasing order of the intensity detected of the received signal.

In step S1, a detection signal is input from the receiving signal level detection block 30. Thereafter, the flow goes to step S2.

In step S2, the detection signal thus fed is judged whether it is the detection signal 1a. If it is the detection signal 1a, after data associated therewith is read from the second memory block 35, the flow goes to step S5. If the detection signal thus fed is not the detection signal 1a, then the flow goes to step S3.

In step S3, the detection signal thus fed is judged whether it is the detection signal 1b. If it is the detection signal 1b, after data associated therewith is read from the second memory block 35, the flow goes to step S5. If the detection signal thus fed is not the detection signal 1b, then the flow goes to step S4.

In step S4, the detection signal thus fed is the detection signal 1c. Therefore, after data associated therewith is read from the second memory block 35, the flow goes to step S5.

In step S5, the switch circuits 36a and 36b of the second switching block 36 and the switch circuits 37a and 37b of the third switching block 37 are controlled in accordance with the data read during any one of steps 2 to 4. Thereafter, the flow returns to step S1.

As described above, if the input detection signal is the detection signal 1a, the second control block 34 controls the second switching block 36 and the third switching block 37 so that; of the second switching block 36, the switch circuit 36a is turned off and the switch circuit 36b is turned off; and of the third switching block 37, the switch circuits 37a is turned on and the switch circuit 37b is turned on. As a result, the amplifier 13a is brought into the shortcircuited state while power supplied thereto is turned off and the amplifier 13b is brought into the shortcircuited state while power supplied thereto is turned off.

In the same manner, if the input detection signal is the detection signal 1b, the second control block 34 controls the second switching block 36 and the third switching block 37 so that; of the second switching block 36, the switch circuit 36a is turned on and the switch circuit 36b is turned off; and of the third switching block 37, the switch circuits 37a is turned off and the switch circuit 37b is turned on. As a result, the amplifier 13a is brought into the non-shortcircuited state while power supplied thereto is turned on and the amplifier 13b is brought into the shortcircuited state while power supplied thereto is turned off.

Again, in the same manner, if the input detection signal is the detection signal 1c, the second control block 34 controls the second switching block 36 and the third switching block 37 so that; of the second switching block 36, the switch circuit 36a is turned on and the switch circuit 36b is turned on; and of the third switching block 37, the switch circuits 37a is turned off and the switch circuit 37b is turned off. As a result, the amplifier 13a is brought into the non-shortcircuited state while power supplied thereto is turned on and the amplifier 13b is brought into the non-shortcircuited state while power supplied thereto is turned on.

In the aforementioned card-type wireless communication device 1 and wireless communication system 2, the relationship between two groups of the detection signals; a first group including the first, second, third, and fourth detection signals in decreasing order of the intensity detected of the received signal, which is output from the receiving signal level detection block 30 to the first control block 31; and a second group including the detection signals 1a, 1b, and 1c in decreasing order of the intensity detected of the received signal, which are output from the receiving signal level detection block 30 to the second control block 34, is such that, for example, while the first detection signal is being output, one of the detection signals 1a, 1b, or 1c, in decreasing order of the intensity detected of the received signal, is also output.

It is to be understood that, in the aforementioned card-type wireless communication device 1 and wireless communication system 2, although the embodiments deal with the case where the second switching block 36 comprises the two switch circuits 36a and 36b, and the third switching block 37 comprises the two switch circuits 37a and 37b for controlling the two amplifiers 13a and 13b, applications are not limited to this case and it is also possible to arrange any number of switch circuits in the second switching block 36 and the third switching block 37 for controlling the corresponding number of amplifiers.

According to one aspect of the present invention, a card-type wireless communication device connected to an information terminal device, comprises an antenna; a receiver circuit for performing frequency conversion and demodulation on a high-frequency signal received through the antenna so as to output a base-band reception signal; a transmitter circuit for performing modulation and frequency conversion on a base-band transmission signal fed thereto so as to output a high-frequency signal to the antenna; a base-band signal processing circuit for processing the base-band reception signal and the base-band transmission signal; an interface circuit that functions as an interface between the card-type wireless communication device and the information terminal device; a power supply circuit for supplying power to each of the transmitter circuit, the base-band signal processing circuit, and the interface circuit; a connector for connecting the card-type wireless communication device to the information terminal device; a receiving signal level detection block that outputs a plurality of different detection signals according to intensity of the high-frequency signal received through the antenna; a first switching block that for turning on or off, for each of the transmitter circuit, the base-band signal processing circuit, and the interface circuit, power fed from the power supply circuit thereto; a first memory block for storing data as to which of the transmitter circuit, the base-band signal processing circuit, and the interface circuit to turn on or off in association with each of the detection signals; and a first control block for controlling the first switching block so as to turn on or off power fed to each of the transmitter circuit, the base-band signal processing circuit, and the interface circuit according to the detection signals and the data stored in the first memory block.

According to the present invention, it is possible to provide the card-type wireless communication device in which power saving is achieved by turning on or off, for each of the transmitter circuit, the base-band signal processing circuit and the interface circuit independently, power supplied from the power supply circuit thereto, according to the intensity of the high-frequency signal received through the antenna.

According to another aspect of the present invention, the card-type wireless communication device as described above, further comprises a plurality of amplifiers included in the receiver circuit and connected in series with each other for amplifying the high-frequency signal received through the antenna; a second switching block for turning on or off, for each of the amplifiers independently, power fed from the power supply circuit thereto; a third switching block for bringing into the shortcircuited or non-shortcircuited state each of the amplifiers independently; a second memory block for storing data as to which of the amplifiers to turn on or off in association with each of the detection signals; and a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

According to the present invention, it is possible to provide the card-type wireless communication device in which power saving is achieved by turning on or off, for each of the transmitter circuit, the base-band signal processing circuit and the interface circuit independently, power supplied from the power supply circuit thereto, according to the intensity of the high-frequency signal received through the antenna. Further power saving is also achieved by the arrangement in which power supplied from the power supply circuit to each of the amplifiers is turned on or off independently according to the intensity of the high-frequency signal received through the antenna.

According to another aspect of the present invention, in the card-type wireless communication device as described above, the receiving level detection circuit outputs a first detection signal, a second detection signal, third detection signal, or a fourth detection signal in decreasing order of the intensity detected of the received signal, and the data stored in the first memory block is such that in association with the first detection signal, all of the transmission circuit, the base-band signal processing circuit, and the interface circuit are turned on; in association with the second detection signal, the transmission circuit is turned off and the base-band signal processing circuit and the interface circuit are turned on; in association with the third detection signal, the transmission circuit and the base-band signal processing circuit are turned off and the interface circuit is turned on; and in association with the fourth detection signal, all of the transmission circuit, the base-band signal processing circuit, and the interface circuit are turned off.

According to the present invention, the card-type wireless communication device is configured so as to turn off the circuit having a lower functional priority first so that power is turned off for; only the transmitter circuit; only the transmitter circuit and the base-band signal processing circuit; or all of the transmitter circuit, the base-band signal processing circuit, and the interface circuit in accordance with decreasing order of the intensity detected of the received signal. In this configuration, in addition to achieving the power saving, it is also possible to perform a quick recovery of the circuit from power-off state when the intensity of the received signal changes from low to high.

According to another aspect of the present invention, in a card-type wireless communication device as described above, the high-frequency signal transmitted or received through the antenna is in a 2.4-GHz frequency band and uses a frequency-hopping system based on spread-spectrum technology.

According to the present invention, it is possible to reduce power consumed by the card-type wireless communication device incorporating, for example, Bluetooth technology, which is a low-range wireless data communication standard.

According to another aspect of the present invention, a wireless communication system having an information terminal device, comprises a card-type wireless communication device, comprising:
an antenna; a receiver circuit for performing frequency conversion and demodulation on a high-frequency signal received through the antenna so as to output a base-band reception signal; a transmitter circuit for performing modulation and frequency conversion on a base-band transmission signal fed thereto so as to output a high-frequency signal to the antenna; a base-band signal processing circuit for processing the base-band reception signal and the base-band transmission signal; an interface circuit that functions as an interface between the card-type wireless communication device and the information terminal device; a power supply circuit for supplying power to each of the transmitter circuit, the base-band signal processing circuit, and the interface circuit; a connector for connecting the card-type wireless communication device to the information terminal device; a receiving signal level detection block that outputs' a plurality of different detection signals according to intensity of the high-frequency signal received through the antenna; and a first switching block for turning on or off, for each of the transmitter circuit, the base-band signal processing circuit, and the interface circuit independently, power fed from the power supply circuit thereto, wherein said information terminal device comprises a first memory block for storing data as to which of the transmitter circuit, the base-band signal processing circuit, and the interface circuit to turn on or off in association with each of the detection signals; and a first control block for controlling the first switching block so as to turn on or off power fed to each of the transmitter circuit, the base-band signal processing circuit, and the interface circuit according to the detection signals and the data stored in the first memory block.

According to the present invention, it is possible to provide the card-type wireless communication device in which power saving is achieved by turning on or off, for each of the transmitter circuit, the base-band signal processing circuit and the interface circuit independently, power supplied from the power supply circuit thereto, according to the intensity of the high-frequency signal received through the antenna.

Moreover, since the first memory block and the first control block are incorporated in the information terminal device, further power saving is achieved by the card-type wireless communication device, thereby contributing to suppressing an increase in temperature of the card-type wireless communication device of the wireless communication system.

Moreover, since the first memory block and the first control block are incorporated in the information terminal device, the number of circuit components for the card-type wireless communication device is decreased, thereby contributing to miniaturization of the card-type wireless communication device of the wireless communication system.

According to another aspect of the present invention, the wireless communication system as described above, further comprises a plurality of amplifiers included in the receiver circuit of the card-type wireless communication device and connected in series with each other for amplifying the high-frequency signal received through the antenna; a second switching block for turning on or off, for each of the amplifiers independently, power fed from the power supply circuit thereto; a third switching block for bringing into the shortcircuited or non-shortcircuited state each of the amplifiers independently; a second memory block included in the information terminal device for storing data as to which of the amplifiers to turn on or off in association with each of the detection signals; and a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

According to the present invention, it is possible to provide the wireless communication system in which power saving is achieved by turning on or off, for each of the transmitter circuit, the base-band signal processing circuit and the interface circuit independently, power supplied from the power supply circuit thereto, according to the intensity of the high-frequency signal received through the antenna. Further power saving is achieved by the arrangement in which power supplied from the power supply circuit to each of the amplifiers is turned on or off independently according to the intensity of the high-frequency signal received through the antenna.

Moreover, since the first and second memory blocks and the first and second control blocks are incorporated in the information terminal device, further power saving is achieved by the card-type wireless communication device, thereby contributing to suppressing an increase in temperature of the card-type wireless communication device.

Moreover, since the first and second memory blocks and the first and second control blocks are incorporated in the information terminal device, the number of circuit components required for the card-type wireless communication device is decreased, thereby contributing to miniaturization of the card-type wireless communication device of the wireless communication system.

According to another aspect of the present invention, in the wireless communication system as described above, the receiving level detection circuit outputs a first detection signal, a second detection signal, third detection signal, or a fourth detection signal in decreasing order of the intensity detected of the received signal, and the data stored in the first memory block is such that in association with the first detection signal, all of the transmission circuit, the base-band signal processing circuit, and the interface circuit are turned on; in association with the second detection signal, the transmission circuit is turned off and the base-band signal processing circuit and the interface circuit are turned on; in association with the third detection signal, the transmission circuit and the base-band signal processing circuit are turned off and the interface circuit is turned on; and in association with the fourth detection signal, all of the transmission circuit, the base-band signal processing circuit, and the interface circuit are turned off.

According to the present invention, the wireless communication system is configured so as to turn off the circuit having a lower functional priority first so that power is turned off for; only the transmitter circuit; only the transmitter circuit and the base-band signal processing circuit; or all of the transmitter circuit, the base-band signal processing circuit, and the interface circuit in accordance with decreasing order of the intensity detected of the received signal. In this configuration, in addition to achieving the power saving, it is also possible to perform a quick recovery of the circuit from power-off state when the intensity of the received signal changes from low to high.

According to another aspect of the present invention, in a wireless communication system as described above, the high-frequency signal transmitted or received through the antenna is in a 2.4-GHz frequency band and uses a frequency-hopping system based on spread-spectrum technology.

According to the present invention, it is possible to reduce power consumed by the wireless communication system incorporating, for example, Bluetooth technology, which is a low-range wireless data communication standard.

What is claimed is:

1. A card-type wireless communication device connected to an information terminal device, comprising:
    an antenna;
    a receiver circuit for performing frequency conversion and demodulation on a high-frequency signal received through the antenna so as to output a base-band reception signal;
    a transmitter circuit for performing modulation and frequency conversion on a base-band transmission signal fed thereto so as to output a high-frequency signal to the antenna;
    a base-band signal processing circuit for processing the base-band reception signal and the base-band transmission signal;
    an interface circuit that functions as an interface between the card-type wireless communication device and the information terminal device;
    a power supply circuit for supplying power to each of the transmitter circuit, the base-band signal processing circuit, and the interface circuit;
    a connector for connecting the card-type wireless communication device to the information terminal device;
    a receiving signal level detection block that outputs a plurality of different detection signals according to intensity of the high-frequency signal received through the antenna;
    a first switching block that for turning on or off, for each of the transmitter circuit, the base-band signal processing circuit, and the interface circuit, power fed from the power supply circuit thereto;
    a first memory block for storing data as to which of the transmitter circuit, the base-band signal processing circuit, and the interface circuit to turn on or off in association with each of the detection signals; and
    a first control block for controlling the first switching block so as to turn on or off power fed to each of the transmitter circuit, the base-band signal processing circuit, and the interface circuit according to the detection signals and the data stored in the first memory block.

2. A card-type wireless communication device as claimed in claim 1, further comprising:
    a plurality of amplifiers included in the receiver circuit and connected in series with each other for amplifying the high-frequency signal received through the antenna;
    a second switching block for turning on or off, for each of the amplifiers independently, power fed from the power supply circuit thereto;
    a third switching block for bringing into the shortcircuited or non-shortcircuited state each of the amplifiers independently;
    a second memory block for storing data as to which of the amplifiers to turn on or off in association with each of the detection signals; and
    a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

3. A card-type wireless communication device as claimed in claim 1,
    wherein the receiving level detection circuit outputs a first detection signal, a second detection signal, third detection signal, or a fourth detection signal in decreasing order of the intensity detected of the received signal,
    and the data stored in the first memory block is such that
    in association with the first detection signal, all of the transmission circuit, the base-band signal processing circuit, and the interface circuit are turned on;
    in association with the second detection signal, the transmission circuit is turned off and the base-band signal processing circuit and the interface circuit are turned on;
    in association with the third detection signal, the transmission circuit and the base-band signal processing circuit are turned off and the interface circuit is turned on; and
    in association with the fourth detection signal, all of the transmission circuit, the base-band signal processing circuit, and the interface circuit are turned off.

4. A card-type wireless communication device as claimed in claim 2,
    wherein the receiving level detection circuit outputs a first detection signal, a second detection signal, third detection signal, or a fourth detection signal in decreasing order of the intensity detected of the received signal,
    and the data stored in the first memory block is such that
    in association with the first detection signal, all of the transmission circuit, the base-band signal processing circuit, and the interface circuit are turned on;
    in association with the second detection signal, the transmission circuit is turned off and the base-band signal processing circuit and the interface circuit are turned on;
    in association with the third detection signal, the transmission circuit and the base-band signal processing circuit are turned off and the interface circuit is turned on; and
    in association with the fourth detection signal, all of the transmission circuit, the base-band signal processing circuit, and the interface circuit are turned off.

5. A card-type wireless communication device as claimed in claim 1,
    wherein the high-frequency signal transmitted or received through the antenna is in a 2.4-GHz frequency band and uses a frequency-hopping system based on spread-spectrum technology.

6. A wireless communication system having an information terminal device, comprising:
    a card-type wireless communication device, comprising:
        an antenna;
        a receiver circuit for performing frequency conversion and demodulation on a high-frequency signal received through the antenna so as to output a base-band reception signal;
        a transmitter circuit for performing modulation and frequency conversion on a base-band transmission signal fed thereto so as to output a high-frequency signal to the antenna;
        a base-band signal processing circuit for processing the base-band reception signal and the base-band transmission signal;

an interface circuit that functions as an interface between the card-type wireless communication device and the information terminal device;
a power supply circuit for supplying power to each of the transmitter circuit, the base-band signal processing circuit, and the interface circuit;
a connector for connecting the card-type wireless communication device to the information terminal device;
a receiving signal level detection block that outputs a plurality of different detection signals according to intensity of the high-frequency signal received through the antenna; and
a first switching block for turning on or off, for each of the transmitter circuit, the base-band signal processing circuit, and the interface circuit independently, power fed from the power supply circuit thereto;
wherein said information terminal device comprises
a first memory block for storing data as to which of the transmitter circuit, the base-band signal processing circuit, and the interface circuit to turn on or off in association with each of the detection signals; and
a first control block for controlling the first switching block so as to turn on or off power fed to each of the transmitter circuit, the base-band signal processing circuit, and the interface circuit according to the detection signals and the data stored in the first memory block.

7. A wireless communication system as claimed in claim 6, further comprising:
a plurality of amplifiers included in the receiver circuit of the card-type wireless communication device and connected in series with each other for amplifying the high-frequency signal received through the antenna;
a second switching block for turning on or off, for each of the amplifiers independently, power fed from the power supply circuit thereto;
a third switching block for bringing into the shortcircuited or non-shortcircuited state each of the amplifiers independently;
a second memory block included in the information terminal device for storing data as to which of the amplifiers to turn on or off in association with each of the detection signals; and
a second control block for controlling the second switching block so as to turn on or off power fed to each of the amplifiers according to the detection signals and the data stored in the second memory block and controlling the third switching block so as to bring any amplifier that is turned on into the non-shortcircuited state and any amplifier that is turned off into the shortcircuited state.

8. A wireless communication system as claimed in claim 6,
wherein the receiving level detection circuit outputs a first detection signal, a second detection signal, third detection signal, or a fourth detection signal in decreasing order of the intensity detected of the received signal,
and the data stored in the first memory block is such that
in association with the first detection signal, all of the transmission circuit, the base-band signal processing circuit, and the interface circuit are turned on;
in association with the second detection signal, the transmission circuit is turned off and the base-band signal processing circuit and the interface circuit are turned on;
in association with the third detection signal, the transmission circuit and the base-band signal processing circuit are turned off and the interface circuit is turned on; and
in association with the fourth detection signal, all of the transmission circuit, the base-band signal processing circuit, and the interface circuit are turned off.

9. A wireless communication system as claimed in claim 7,
wherein the receiving level detection circuit outputs a first detection signal, a second detection signal, third detection signal, or a fourth detection signal in decreasing order of the intensity detected of the received signal,
and the data stored in the first memory block is such that
in association with the first detection signal, all of the transmission circuit, the base-band signal processing circuit, and the interface circuit are turned on;
in association with the second detection signal, the transmission circuit is turned off and the base-band signal processing circuit and the interface circuit are turned on;
in association with the third detection signal, the transmission circuit and the base-band signal processing circuit are turned off and the interface circuit is turned on; and
in association with the fourth detection signal, all of the transmission circuit, the base-band signal processing circuit, and the interface circuit are turned off.

10. A wireless communication system as claimed in claim 6,
wherein the high-frequency signal transmitted or received through the antenna is in a 2.4-GHz frequency band and uses a frequency-hopping system based on spread-spectrum technology.

* * * * *